R. GOLDEN.
TRANSMISSION GEARING.
APPLICATION FILED JULY 3, 1913.

1,110,437.

Patented Sept. 15, 1914.
2 SHEETS—SHEET 1.

Witnesses
Philip C. Barnes
E. J. Sheely.

Inventor
Robert Golden
By James J. Sheely & Co.
Attorneys

R. GOLDEN.
TRANSMISSION GEARING.
APPLICATION FILED JULY 3, 1913.
1,110,437.
Patented Sept. 15, 1914.
2 SHEETS—SHEET 2.
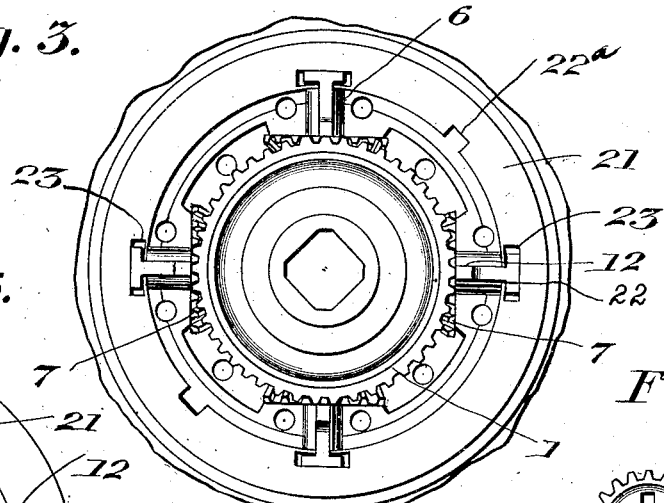
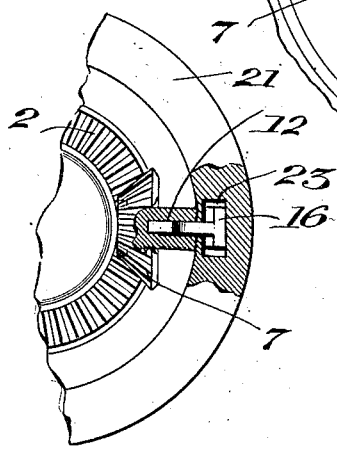
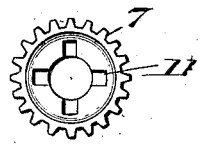
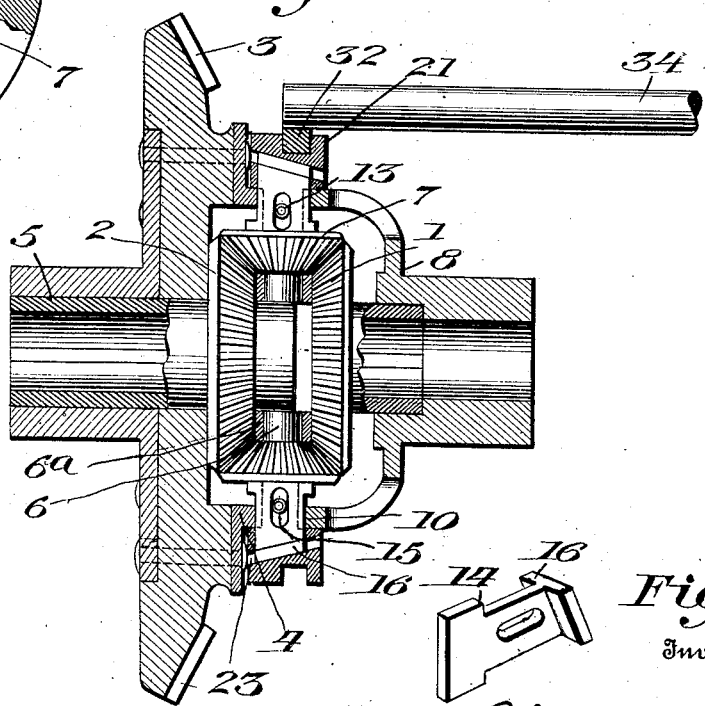
Witnesses
Philip E. Barnes
E. T. Sheehy
Inventor
Robert Golden
By James J. Sheehy & Co.
Attorneys

UNITED STATES PATENT OFFICE.

ROBERT GOLDEN, OF MEEHAN JUNCTION, MISSISSIPPI.

TRANSMISSION-GEARING.

1,110,437.      Specification of Letters Patent.     Patented Sept. 15, 1914.

Application filed July 3, 1913. Serial No. 777,177.

*To all whom it may concern:*

Be it known that I, ROBERT GOLDEN, citizen of the United States, residing at Meehan Junction, in the county of Lauderdale and State of Mississippi, have invented new and useful Improvements in Transmission-Gearing, of which the following is a specification.

My present invention pertains to transmission gearing for motor vehicles; and it contemplates the provision of easily-operated, compact and efficient means for enabling an automobile operator, when occasion demands, to readily lock both of the traction wheels to the wheel that derives motion from the engine or motor, and as readily unlock the traction wheels and restore the transmission gearing or equalizer to its normal working state.

It is well known that when an automobile is traversing a heavy or sandy road, it is advantageous for both of the traction wheels to be fixed with respect to the element that derives motion from the motor, while when the machine is traveling over a hard smooth road it is equally advantageous for the equalizing transmission gearing to operate in the ordinary well known manner.

Figure 1:
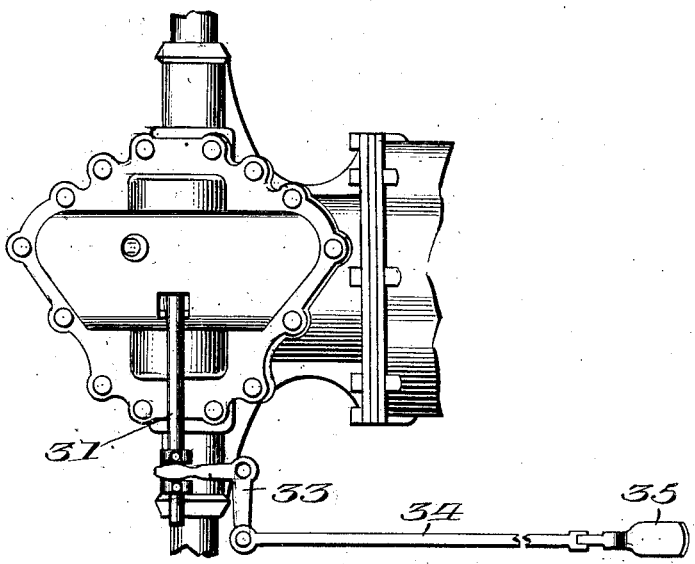
Figure 2:
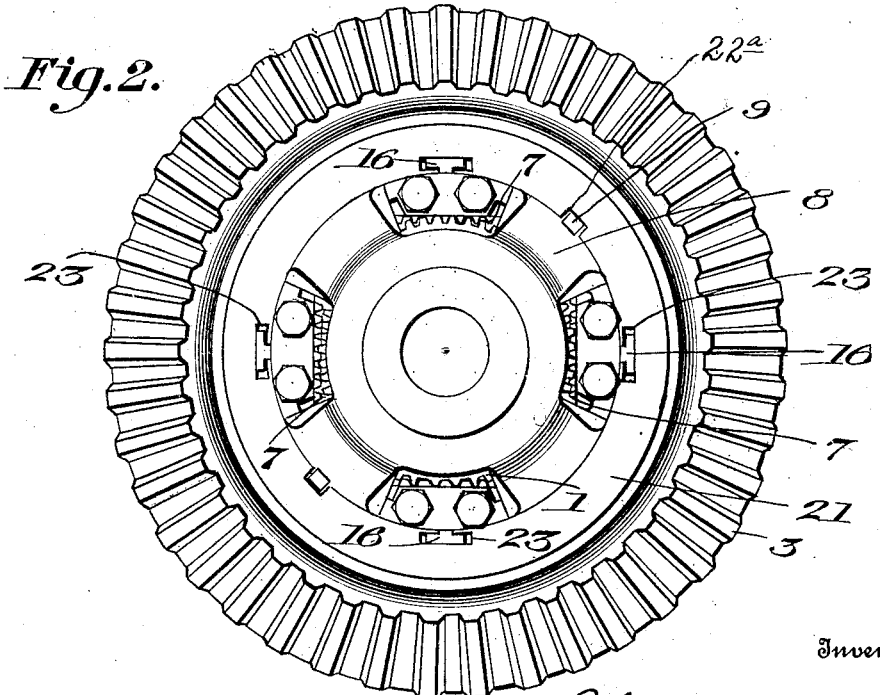

With the foregoing in mind, the invention will be fully understood from the following description and claims when the same are read in connection with the drawings, accompanying and forming part of this specification, in which:

Figure 1 is a plan view illustrative of a gear casing containing my improvement, and also illustrative of the controlling means I prefer to employ. Fig. 2 is an enlarged elevation showing the transmission gearing constructed in accordance with my invention. Fig. 3 is a broken elevation showing the housing section contained in Fig. 2 as removed. Fig. 4 is a view, partly in diametrical section and partly in elevation, of the gearing constructed in accordance with my invention. Fig. 5 is a detail view showing the relative arrangement of one of the beveled pinions, its spindle, the adjusting ring, and the key complementary to the pinion and spindle. Fig. 6 is an elevation showing the outer side of one of the pinions. Fig. 7 is a perspective of one of the keys.

Similar numerals of reference designate corresponding parts in all of the views of the drawings.

The transmission gearing illustrated comprises the usual beveled gear 1 for connection to the axle of one traction wheel, and the usual beveled gear 2 for connection to the axle of the other traction wheel. Fixed with respect to a gear wheel 3 that derives motion from the motor of the vehicle, and extending laterally inward therefrom is an annular flange 4. The usual central sleeve 5 that is fixed with respect to the beveled gear 2 is employed, and extending between and fixed to a boss 6ª and the flange 4 are four (more or less) spindles or arbors 6 on which are loosely mounted beveled pinions 7 that are interposed between and intermeshed with the beveled gears 1 and 2. At this point attention is directed to the fact that when the pinions 7 are loose or free to turn on the spindles 6, the equalizing transmission gearing is adapted to operate in the ordinary well-known manner. When, however, the pinions 7 are keyed or locked to their respective spindles 6, as hereinafter described, the axles complementary to the gears 1 and 2 will be locked together, and on turning of the wheel 3 the traction wheels on both of said axles will be positively driven as if they were in one piece. As clearly appears in Fig. 4, the gear 3 is loose on the exteriorly-circular sleeve 5 of the gear 2.

In furtherance of my invention, I provide the housing section 8 of the gearing with ribs 9 and key-receiving recesses 10. Also in furtherance of the present invention, notches 11 are provided in the interposed pinions, and key-receiving recesses 12 are provided in the spindles or arbors, which recesses 12 are intersected by pins 13 arranged transversely of the spindles or arbors.

Arranged in the key-receiving recesses 10 of the housing section 8, and also in the key-receiving recesses 12 of the arbors or spindles, are keys 14. These keys are slotted to receive rollers 15 on the pins 13, and are designed to be moved into the notches 11 of the pinions to lock the pinions to the spindles or arbors, and out of said notches to render the pinions loose on the spindles or arbors, for the purposes hereinbefore set forth. It will be manifest by reference to the drawings that each key 14 is provided at its outer end with T-head 16, and that the said head is inclined in the direction of the length thereof. The pins 13 and rollers 15 manifestly constitute fasteners for holding the keys 14 in the spindles 6.

Guided on the ribs 9 of the housing section 8 and loosely surrounding the circular flange on the wheel 3, and movable laterally toward and from the side of the said wheel is a circumferentially-grooved ring 21. This ring 21 is provided with notches 22ª that receive the ribs 9, notches 22 that receive the radially-disposed portions of the keys, and inclined cam grooves 23 that receive the inclined heads of the keys. Consequently when the ring 21 is moved in a direction away from the wheel 3, the inner end portions of the keys will be drawn out of the pinions to render the pinions loose on the spindles or arbors, while when the ring 21 is moved toward the wheel 3, the keys will be moved endwise inwardly into the notches of the pinions to lock the pinions to the spindles or arbors and lock the beveled gears 1 and 2 to each other. In the first position of the keys, the gearing is adapted to operate in the ordinary well known manner, while in the second position of the keys the two axles are secured together and will turn as one piece. It will also be manifest that when the ring 21 is held by any approved means in its position away from the wheel 3, there is no liability of the keys interfering with the rotation of the pinions about their spindles and the ordinary well known operation of the gearing.

Any suitable means may be employed for enabling the automobile operator to move and control the ring 21. I prefer, however, to employ the rod 31 guided in the gear casing and having a curvilinear portion 32 seated in the circumferential groove of the ring, a suitably supported bell-crank 33 having one of its arms connected to the outer portion of the rod 31, and a rod 34 extending forwardly from the other arm of the bell-crank and connected to a lever 35, disposed adjacent the seat of the automobile operator.

Having described my invention, what I claim and desire to secure by Letters Patent is—

1. The combination with opposed gears, a wheel adapted to be rotated, pinions interposed between said gears, and spindles carried by said wheel, on which said pinions are loosely mounted, said pinions having interior notches and said spindles having recesses and key-fasteners therein; of keys mounted in said recesses and on said fasteners and having inner end portions movable into and out of the pinion notches and also having inclined T-heads at their outer ends, and a laterally-movable ring surrounding the keys and having notches receiving the radially-disposed portions of the keys and also having inclined cam grooves receiving the T-heads of the keys.

2. The combination with opposed gears, a wheel adapted to be rotated, pinions interposed between said gears, and spindles carried by said wheel, on which said pinions are loosely mounted, said pinions having interior notches and said spindles having recesses and key-fasteners therein; of keys mounted in said recesses and on said fasteners and having inner end portions movable into and out of the pinion notches and also having inclined T-heads at their outer ends, a laterally-movable circumferentially-grooved ring surrounding the keys and having notches receiving the radially-disposed portions of the keys and also having inclined cam-grooves receiving the T-heads of the keys, an endwise movable rod having a portion disposed in the circumferential groove of the ring, and means for moving said rod.

3. The combination with opposed gears, a wheel adapted to be rotated, pinions interposed between said gears, and spindles carried by said wheel, on which said pinions are loosely mounted, of keys constructed and arranged in one position to lock the pinions to said spindles, and in another position to render the pinions loose on the spindles, and means for moving the keys from one position to the other and vice versa.

4. The combination with a transmission gearing comprising opposed beveled gears, a wheel loose with respect to said gears and adapted to be connected with a motor and having a lateral annular flange, recessed spindles connected with said flange, interiorly notched pinions loosely mounted on said spindles, and a housing section connected to said flange and having key-receiving recesses and also having exterior guide ribs; of a laterally-movable flange guided on said ribs and having notches in its inner side and inclined cam recesses communicating with said notches, and endwise-movable keys arranged in the key-receiving recesses of the spindles and housing section and extending through the notches in the ring and having inclined T-heads disposed in the inclined cam recesses of the ring.

In testimony whereof I have hereunto set my hand in presence of two subscribing witnesses.

ROBERT GOLDEN.

Witnesses:
PAUL BROWN,
J. E. HAIRSTON.